Patented May 10, 1927.

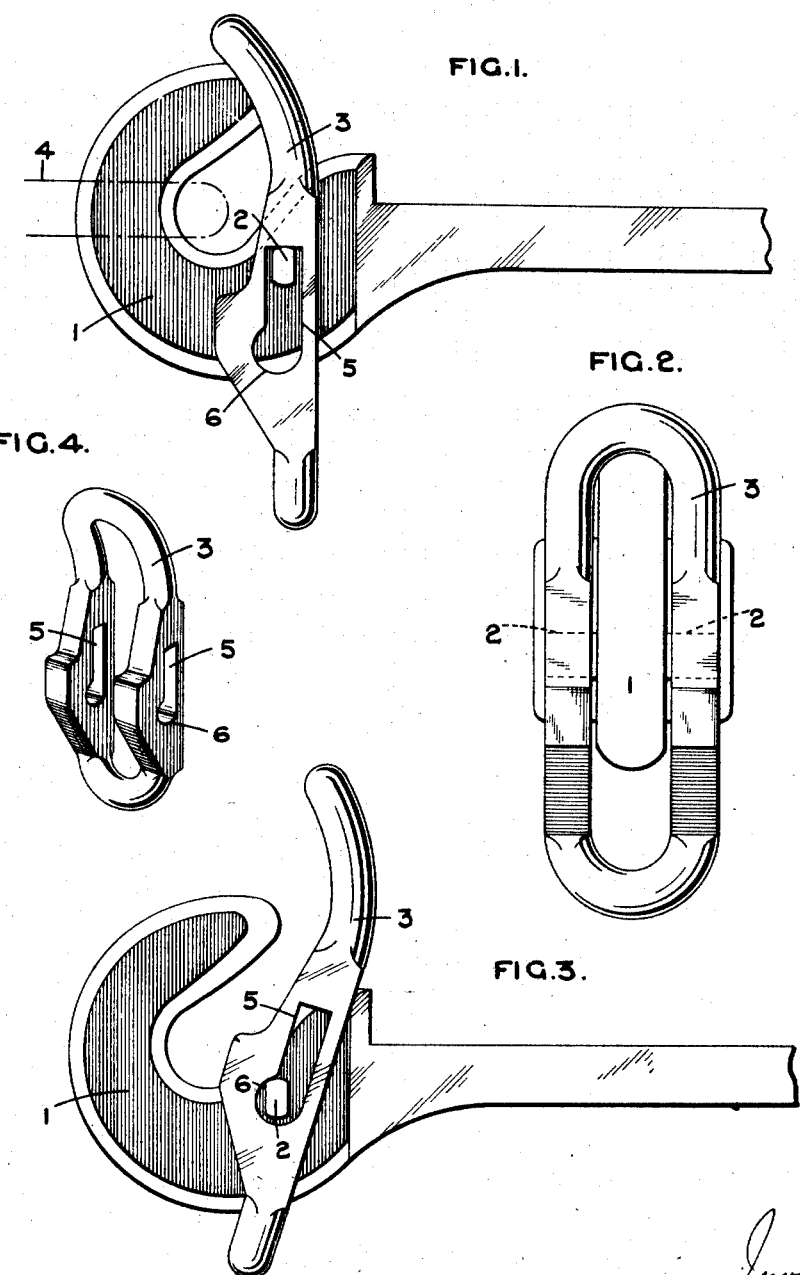

1,628,587

UNITED STATES PATENT OFFICE.

THOMAS FRANKS, OF WALSALL, ENGLAND.

DRAWBAR COUPLING.

Application filed November 24, 1925, Serial No. 71,196, and in Great Britain December 1, 1924.

This invention relates to a safety appliance for drawbar couplings in which a hook is engaged by a chain or other member and the invention is primarily intended for rail vehicles and will be found particularly useful for trucks used in mines as a means for preventing the accidental unfastening of a coupling which has in the past been the cause of many disasters.

According to the present invention the hook is provided with a releasable safety catch member in the form of a link or lever, the engagement between which and the hook takes the form of a pin and slot engagement, the arrangement being such that one part of the slot is relatively narrow and engages one or more flat sides on the pin so that pivotal or turning movement of the safety member is prevented when the safety member is in its locking position, while another part of the slot is of part circular or other enlarged form which will permit of pivotal movement of the safety member to allow it to move into its released position.

Referring to the drawings:—

Figure 1 is a side elevation of the coupling in its locked condition.

Figure 2 is an end view of same.

Figure 3 is a similar view to Figure 1 but showing the coupling open.

Figure 4 shows the locking member removed.

In the preferred arrangement as shown upon the accompanying drawings the hook 1 is provided with laterally projecting pins 2, 2 at its sides upon which is mounted the safety locking member 3. The safety member 3 may be formed as a loop engaging over the end of the hook and capable of occupying two positions, one of which I have referred to as the "locking" position (as Figure 1), in which the safety member closes the entrance to the hook, and the other of which (Figure 3) is the "open" or released position in which the safety member has made a pivotal movement to permit the chain or its equivalent indicated at 4 in Figure 1 to be released from the hook.

The pin or pins projecting laterally from the sides of the hook are preferably provided with a pair of flat parallel sides which may be arranged substantially vertically and the sides or cheeks of the safety member are slotted at 5 to engage over the said pins.

The slots may be of substantially inverted key hole shape, their upper ends being relatively narrow so that the sides of the slot engage the flat sides of the pin so as to prevent pivotal movement of the safety member when in its locking position, whilst the enlarged parts 6 permit angular movement in relation to the hook.

The weight of the safety member retains it in its locking position effectively, causing the locking member to move into a position in which the upper narrow ends of the slots engage with the flat sides of the pins so that the locking member cannot be turned to release the hook.

In order to unfasten the coupling it is necessary to raise the safety member until the lower parts of the slots engage with the pins and the lower parts of the slots being part circular permit of the safety member being turned on the pins to permit the chain or its equivalent to be removed from the hook.

The lower part of the safety member may be purposely constructed to be heavier than its upper part so that the safety member is automatically retained in its locking position.

Instead of providing the pin or pins on the hook and the slots in the safety member, the pin may be provided on the safety member and a slot may be provided in the hook.

Instead of providing straight slots of inverted key hole form, curved slots may be provided in the safety member, the upper ends of which are narrow so that the safety member is prevented from turning when in its locking position, the said slots being provided with a wider portion below which permit of the safety member being turned after it has been raised.

The hook may be formed integrally with the draw bar or it may be constructed so that it can be readily riveted or secured to the draw bar of the vehicle. It is preferred to form the draw bar, hook and pin integrally as a solid steel or other metal forging.

What I claim then is:—

In combination with a draw bar having an upstanding hook, a locking member forming a loop through which the hook end of the draw bar passes, said locking member having longitudinal slots in its side portions intermediate its ends and each provided at the lower end with an enlargement, the sides of said slots being substantially parallel, said draw bar being provided with outstanding pins extending into said slots of the locking member and forming pivots on which said locking member may turn, the width of said pins being less than that of said slots and said pins having parallel vertical sides and said slots being of such length that when said locking member is in substantially vertical position the narrow ends of the slots bear on the upper sides of the pins and said locking member by gravity maintains such vertical position extending across the throat of the hook and so that the locking member is prevented from turning casually to released position and said locking member when moved upwardly to cause the pins to engage in the enlarged lower ends of the slots being then adapted to be swung rearwardly to open the throat of the hook.

In witness whereof I affix my signature.

THOMAS FRANKS.